US008239312B2

(12) United States Patent
Zhou et al.

(10) Patent No.: US 8,239,312 B2
(45) Date of Patent: Aug. 7, 2012

(54) METHOD AND APPARATUS FOR NET-PAY AND DEBT CONSOLIDATION

(75) Inventors: Cheng Zhou, Austin, TX (US);
Rangarajan Venkastesan, Austin, TX (US); Joshua Toub, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 3446 days.

(21) Appl. No.: 09/810,519

(22) Filed: Mar. 15, 2001

(65) Prior Publication Data

US 2002/0133458 A1    Sep. 19, 2002

(51) Int. Cl.
*G06Q 40/00* (2012.01)

(52) U.S. Cl. ....... 705/37; 705/7.34; 705/7.42; 705/27.1; 705/32; 705/39; 705/40; 705/59; 707/944

(58) Field of Classification Search ............ 705/37, 705/40, 59, 39, 7.34, 27.1, 7.42, 32; 707/944
See application file for complete search history.

(56) References Cited

U.S. PATENT DOCUMENTS

| | | | |
|---|---|---|---|
| 4,825,360 | A | 4/1989 | Knight, Jr. |
| 5,369,732 | A | 11/1994 | Lynch et al. |
| 5,483,444 | A | 1/1996 | Heintzeman et al. |
| 5,515,524 | A | 5/1996 | Lynch et al. |
| 5,708,798 | A | 1/1998 | Lynch et al. |
| 5,732,263 | A | 3/1998 | Havens et al. |
| 5,825,651 | A | 10/1998 | Gupta et al. |
| 5,832,268 | A | 11/1998 | Anderson et al. |
| 5,878,400 | A | 3/1999 | Carter, III |
| 6,002,854 | A | 12/1999 | Lynch et al. |
| 6,105,001 | A * | 8/2000 | Masi et al. ............ 705/14 |

(Continued)

FOREIGN PATENT DOCUMENTS

CA    2210218    12/1996

(Continued)

OTHER PUBLICATIONS

Hansen, Hans Robert, "Wirtschaftsinformatik I," Lucius & Lucius.

(Continued)

*Primary Examiner* — Daniel Felten
(74) *Attorney, Agent, or Firm* — Hamilton & Terrile, LLP; Kent B. Chambers

(57) ABSTRACT

A method and apparatus for consolidating net-pay and debt management of a sales representative or sales team is presented. A party associated with the sales representatives may obtain debts and specify rules on payment of those debts which can be tracked back to the domain (e.g., agreements, rules, sale item, etc.). The ledger items created for that distributor by the commission engine are typically processed to distribute payments into accounts specified by the distributor and to pay debts obtained by the distributor. Available money may be split into various methods of payments for a distributor. These splits can be tracked by adding various constraints (related to the financial industries business model). The system allows the user to model the payment rule/constraints. Payment splits support pay-outs to alternate payee from funds of a distributor. The distributor may specify deduction rules which can be applied to the distributors earning to facilitate deductions for items such as taxes, mutual funds etc. The system offers the flexibility to choose the method of payment for a distributor for each issued debt. Debt repayment rules are introduced so that debts can be repaid from available earnings of a distributor. Debt collection mechanisms for defaulters are also provided.

28 Claims, 6 Drawing Sheets

U.S. PATENT DOCUMENTS

| | | | |
|---|---|---|---|
| 6,134,533 | A | 10/2000 | Shell |
| 6,157,922 | A | 12/2000 | Vaughan |
| 6,275,871 | B1 | 8/2001 | Reinfelder et al. |
| 6,347,306 | B1 * | 2/2002 | Swart .............................. 705/32 |
| 6,662,164 | B1 * | 12/2003 | Koppelman et al. ............ 705/14 |
| 2004/0039640 | A1 * | 2/2004 | Koppelman et al. ............ 705/14 |

FOREIGN PATENT DOCUMENTS

| | | |
|---|---|---|
| CA | 2302820 | 6/1997 |
| CA | 2227103 | 12/1997 |
| EP | 0817017 A2 | 7/1998 |
| JP | 6-131362 | 5/1994 |

OTHER PUBLICATIONS

Trilogy-Volvo Master License Agreement, Apr. 29, 1997.

U.S. Patent & Trademark Office, PALM Sample Printouts, published Oct. 31, 1989.

U.S. Patent & Trademark Office, Examiner's Bi-Weekly Time Worksheet (Form PTO 690E), 1995.

Martin, James, Principles of Object-Oriented Analysis and Design, Prentice Hall, 1993.

Patent Office Professional Association, Agreement between U.S. Department of Commerce/Patent and Trademark Office and the Patent Office Professional Association, pp. 39, 93, 94, 97-100, 1996.

U.S. Patent and Trademark Office, Manual of Patent Program Procedure, published Oct. 31, 1989.

U.S. Patent and Trademark Office, PALM 3 User's Guide, published Oct. 31, 1989.

"SC Commission" [Retrieved from the Internet, http://web.archive.org/web/1997062419305... www.trilogy.com/modules/sccommission on Feb. 4, 2002. The snapshot of this web page was downloaded to web.archive.org on Jun. 24, 1997; however, the page information states that the "SC Commission" web page was last modified on Mar. 12, 1997.].

"Selling Chain" [Retrieved from the Internet, http://web.archive.org/web/19970624190842/www.trilogy.com/products1 on Feb. 4, 2002. The snapshot of this web page was downloaded to web.archive.org on Jun. 24, 1997; however, the page information states that the "Selling Chain" web page was last modified on Mar. 6, 1997.].

M.J. Quinn, Encyclopedia of Computer Science, 3rd ed., ed. by Anthony Ralston & Edwin D. Reilly (New York: Van Nostrand Reinhold, 1993) s.v. Parallel Processing, Principles.

P. Wegner, Encyclopedia of Computer Science, 3rd ed., ed. by Anthony Ralston & Edwin D. Reilly (New York: Can Nostrand Reinhold, 1993) s.v. Object-Oriented Programming.

U.S. Appl. No. 08/780,600, Shah et al.
U.S. Appl. No. 08/931,878, Gupta.
U.S. Appl. No. 09/081,857, Koppelman et al.
U.S. Appl. No. 09/163,752, Waugh et al.
U.S. Appl. No. 09/165,656, Gupta.
U.S. Appl. No. 09/253,427, Carter, III.
U.S. Appl. No. 09/413,963, Lynch et al.
U.S. Appl. No. 09/730,481, Vaughan.
U.S. Appl. No. 09/809,991, Chao et al.
U.S. Appl. No. 09/810,012, Chao et al.
U.S. Appl. No. 09/810,514, Chao et al.
U.S. Appl. No. 09/810,515, Zhou et al.
U.S. Appl. No. 09/896,140, Gharavy.
U.S. Appl. No. 09/896,144, Gharavy.

Norman Walsh, XSL The Extensible Style Language [online]. Web Techniques, Jan. 1999 [retrieved on Feb. 11, 2001]. Retrieved from the Internet: <URL: http://www.webtechniques.com/archives/1990/01/walsh/>.

Selena Sol, What is a Markup Language [online]. Web Developer's Virtual Library, Mar. 8, 1999 [retrieved on Apr. 17, 2001]. Retrieved from the Internet: <URL: http://wdvl.internet.com/Authoring/Languages/XML/Tutorials/Intro/what_is_markup_language>.

Selena Sol, What is XML [online]. Web Developer's Virtual Library, Mar. 8, 1999 [retrieved on Feb. 11, 2001]. Retrieved from the Internet: <URL:http://wdvl.internet.com/Authoring/Languages/XML/Tutorials/Intro/what_is_xml.html.>.

Selena Sol, The Well-Formed Document [online]. Web Developer's Virtual Library, Mar. 29, 1999 [retrieved on Feb. 11, 2001]. Retrieved from the Internet: <URL:http://wdvl.internet.com/Authoring/Languages/XML/Tutorials/Intro/well_formed_doc.html>.

Selena Sol, Introducing the Valid XML Document and the DTD [online]. Web Developer's Virtual Library, May 3, 1999 [retrieved on Feb. 11, 2001]. Retrieved from the Internet: <URL:http://wdvl.internet.com/Authoring/Languages/XML/Tutorials/Intro/dtd_intro.html>.

XSTL, Xpath and XSL Formatting Objects [online]. Web Developer's Virtual Library [retrieved on Feb. 11, 2001]. Retrieved from the Internet: <URL:http://wdvl.internet.com/Authoring/Languages/XSL>.

Adam Rifkin, A Look at XML [online], [retrieved on Feb. 11, 2001]. Retrieved from the internet: <URL: http://www.webdeveloper.com/xml/xml_a_look_at_xml.html>.

A Flexible Commission System to Improve Your Agency Relationships, CSC: Financial Services—S3+ Contracts and Commissions [online], [retrieved on Aug. 15, 2001]. Retrieved from the Internet: <URL: http://www.csc-fs.com/MARKETS/detail/pc_s3contracts.asp>.

PolicyLink Commission System, CSC: Financial Services [online], [retrieved on Aug. 15, 2001]. Retrieved from the Internet: <URL: http://www.csc-fs.com/MARKETS/detail/la_policylinkcomm.asp>.

Pictorial, Inc.—Insurance and Financial Services Training [online], Dec. 2, 2000 [retrieved on Aug. 16, 2001]. Retrieved from the Internet: <URL: http://www.pictorial.com/>.

What is AppointPAK? [online], [retrieved on Aug. 16, 2001]. Retrieved from the Internet: <URL: http://www.bisys-licensing.com/apptpak/whatis.htm>.

AppointPAK Features & Benefits [online], [retrieved on Aug. 16, 2001]. Retrieved from the Internet: <URL: http://www.bisys-licensing.com/apptpak/features.htm#buried>.

What is e-PAL? [online], [retrieved on Aug. 16, 2001]. Retrieved from the Internet: <URL: http://www.bisys-licensing.com/palvt/whatis.html>.

e-PAL Features & Benefits [online], [retrieved on Aug. 16, 2001]. Retrieved from the Internet: <URL: http://www.bisys-licensing.com/palvt/features.htm#source>.

Nine e-PAL Services, Features and Benefits [online], [retrieved on Aug. 16, 2001]. Retrieved from the Internet: <URL: http://www.bisys-licensing.com/palvt/serv.html#adjust>.

HRMS Enterprise Applications, Human Resources Management, PeopleSoft, Inc. [retrieved on Aug. 16, 2001]. Retrieved from the Internet: <URL: http://www.peoplesoft.com/en/us/products/applications/hrm/HRMS/hrmsea/index.html>.

HRMS Collaborative Applications, Human Resources Management, PeopleSoft, Inc. [online], [retrieved on Aug. 16, 2001]. Retrieved from the Internet: <URL: http://www.peoplesoft.com/en/us/products/applications/hrm/HRMS/hrmsca/index.html>.

Financial Planning Made Easy, American Express, Financial Services [online], [retrieved Aug. 16, 2001]. Retrieved from the Internet: <URL: http://finance.americanexpress.com/sif/cda/page/0,1641,4588,00.asp>.

Advice and Planning, American Express, Financial Services [online], [retrieved on Aug. 16, 2001]. Retrieved from the Internet: <URL: http://finance.americanexpress.com/sif/cda/page/0,1641,7569,00.asp>.

Why ContractMaker, And How Does It Work?, Legal Contracts, Digital Contracts, Inc., [online], [retrieved on Aug. 8, 2001]. Retrieved from the Internet: <URL: http://www.digicontracts.com/info/whyhow.html>.

Frequently Asked Questions, Digital Contracts, Inc., [online], [retrieved on Aug. 16, 2001]. Retrieved from the Internet: <URL: http://www.digicontracts.com/kits/faqs.html>.

* cited by examiner

METHOD AND APPARATUS FOR NET-PAY AND DEBT CONSOLIDATION

BACKGROUND OF THE INVENTION

1. Field of the Invention

This invention relates to the field of computer software. More specifically, the invention relates to performing net pay/debt consolidation when distributing a commission payment.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

In modern business environments, it is commonplace to employ sales representatives to market the goods and services offered for sale. Sales representatives receive compensation based on a salary, the hours worked, and/or on the goods or services sold. When basing compensation on the goods or services sold, sales representatives receive a commission that can be based on profits, net sales, the number of products sold, or some other variable.

To provide sales representatives with an incentive to sell as much as possible or to sell more of a desired product or products at certain prices, sales organizations create incentive plans wherein Commissions (also referred to as Promotions) are provided or offered to the sales representatives when specific sales goals or targets are attained during a defined time period. For example, a Promotion may consist of paying a bonus of $50 if a blue hammer is sold in the month of July or paying $1 for each of the first 1000 hammers sold and $2 for any additional hammer sold in the month of July. Some incentive plans provide for individual sales representatives to be apportioned credit towards a promotional level (such as a bronze, silver, or gold level) when a sale is made.

In addition, an incentive plan may apportion credit (towards a Promotion) to everyone on a sales representative's sales team, to the representative's manager, or someone other than the sales representative himself. Providing credit to persons in a selling chain (i.e., an immediate supervisor, a manager, a senior manager, etc.) is referred to as an override or rolling up (a "roll-up") the selling chain. Figuring out who should be apportioned credit for a sale can be complex and difficult to administer. This is particularly true when a company has several different types of sales people from direct representatives, external agents, telemarketers, to distributors and resellers. The increasing use of sales teams, account territory, and product managers has further complicated the management of sales crediting.

The management of a business can spend a great deal of time and money in developing incentive plans. In the prior art, the creation and distribution of incentive plans is a slow process that is prone to error. Large businesses merely print up or email a plan to retailers. The retailers add Promotions and targets to the plan and distribute the plan to the sales representatives. To calculate the payment or Promotion each sales representative will receive, the sales information is mailed back to the businesses headquarters where the calculations and determinations are made. The Promotion or payment is then transmitted back to the retailer and distributed to the sales representative. Mistakes in the calculations can often be made at headquarters requiring a repetition of the entire process. Often the sales representatives do not receive a copy of the plan prior to making sales. Consequently, the sales representatives are unaware of the basis for their compensation or how an incentive plan works until after compensation is received (which can occur one or two payment periods after the sales have occurred and after the promotion's time period has expired). Such a delay defeats the underlying purpose of an incentive plan to promote the sale of particular products or services (i.e., the sales representative does not know what products or services the sales organization desires to promote).

In today's competitive environment, companies thrive (and survive) on the basis of being able to quickly change and evolve. This is especially true in the sales and marketing area where rapid business changes are the norm. Competitive companies cannot afford being obligated to adhere to a static information infrastructure or a slow incentive plan process that cannot keep up with a rapidly changing business environment.

In a traditional system solution, the particular business rules are broken down into their core components, which in turn are programmed using some computer language. The traditional system is adequate to represent a rigid and static business problem, like a general ledger or inventory system, for example. However, the traditional system is costly when trying to represent a quickly changing business environment like that of a sales organization, which role is to constantly change and to evolve to align itself to changing customer needs, market changes, sales channels and internal business initiatives.

Retailers are often not permitted to modify or create their own incentive plans for the sales representatives. An incentive plan can only be selected from a list of predefined plans created at a business headquarters. Further, sales representatives can often manipulate an incentive plan (by their actions) to obtain additional compensation unintended by management. In addition, the ability to view and organize information regarding sales transactions is unavailable or difficult in the prior art. Thus, retailers cannot easily observe statistics such as the products or services that are selling quickly, which sales teams or representatives are selling the most, the average cost a particular product is being sold for, etc. Furthermore, combining payments made to individuals for a large amount of transactions and/or payments made to teams of individuals may result in creating credits or debits in the individuals accounts. The accounting and bookkeeping required to manage sales accounts due to over payments and debts represent an overhead that maybe costly to businesses.

Thus, a system that accurately and effectively calculates compensation to be paid to sales representatives, and allows flexibility to adjust an incentive plans and manage a sales force accounts as needed in a rapidly changing environment is desired.

SUMMARY OF THE INVENTION

The invention provides for a method and apparatus for determining the commission to be paid to a sales representative or sales team taking into account any debts associated with the sales representative or sales team. For example, an embodiment of the invention provides a method for a distributor to obtain debts and specify rules on payment of those debts which can be tracked back to the domain (e.g., agreements, rules, sale item, etc.). Thus, the invention comprises an extensible method and apparatus for consolidating payment and debt management. Whenever a sale occurs, a Transaction describing the sale is created and input into the Commission System of one embodiment of the invention. Based on a set of Allocation Rules that specify the credit an individual is to receive from a Transaction, the Transactions are converted into one or more Allocations for individual Sales Representatives or Sales Teams.

One or more Quotas specify a target or goal that must be reached to earn commission for each Sales Team. A Quota State indicates the current performance of a Sales Representative with respect to a particular Quota within a particular time frame. The Quotas are used to convert the Allocations/Transactions into Quota Details that specify how to increment or decrement the Quota State.

A Promotion specifies the reward or commission that is received upon attaining a desired level of performance. Once a Quota State reaches a level necessary to receive a Commission or reward as set by a specific Promotion, a ledger item indicating the amount to be paid to a particular Sales Team is created.

An embodiment of the invention provides a method for a distributor to obtain debts and specify rules on payment of those debts which can be tracked back to the domain (e.g., agreements, rules, sale item, etc.). The ledger items created for that distributor are typically processed to distribute payments into accounts specified by the distributor and to pay debts obtained by the distributor. The invention provides the ability to split the available money for a distributor in various methods of payments. These splits can be tracked by adding various constraints (related to the financial industries business model). The system allows the user to model the payment rule/constraints. Payment splits support pay-outs to alternate payee from funds of a distributor. The distributor may specify deduction rules which can be applied to the distributors earning to facilitate deductions for items such as taxes, mutual funds etc. The system has Global deduction components, which form the template for adding deduction rules for a party.

The invention allows issuance of debt for a distributor in a multiple step process. First the user has to set up debt issuance rules; these rules could apply to all parties in the system, group of parties or may be party specific. The user can also specify a rule based on some criteria in the object model. After setting up debt rules, debt could be issued to a distributor depending on their qualification. The system offers the flexibility to choose the method of payment for a distributor for each debt being issued. Additionally, the invention provides a method for approval of the debt, whereby debt repayment rules are introduced so that the debt could be repaid from the available earnings of the distributor. Debt collection mechanisms for defaulters are also provided.

A user interface may be used to create Allocation Rules, Quotas, and Promotions that are awarded for performance over a specified time period. In this manner, a business may set up incentive plans and determine commissions easily and accurately.

DETAILED DESCRIPTION OF THE INVENTION

Figure 1:
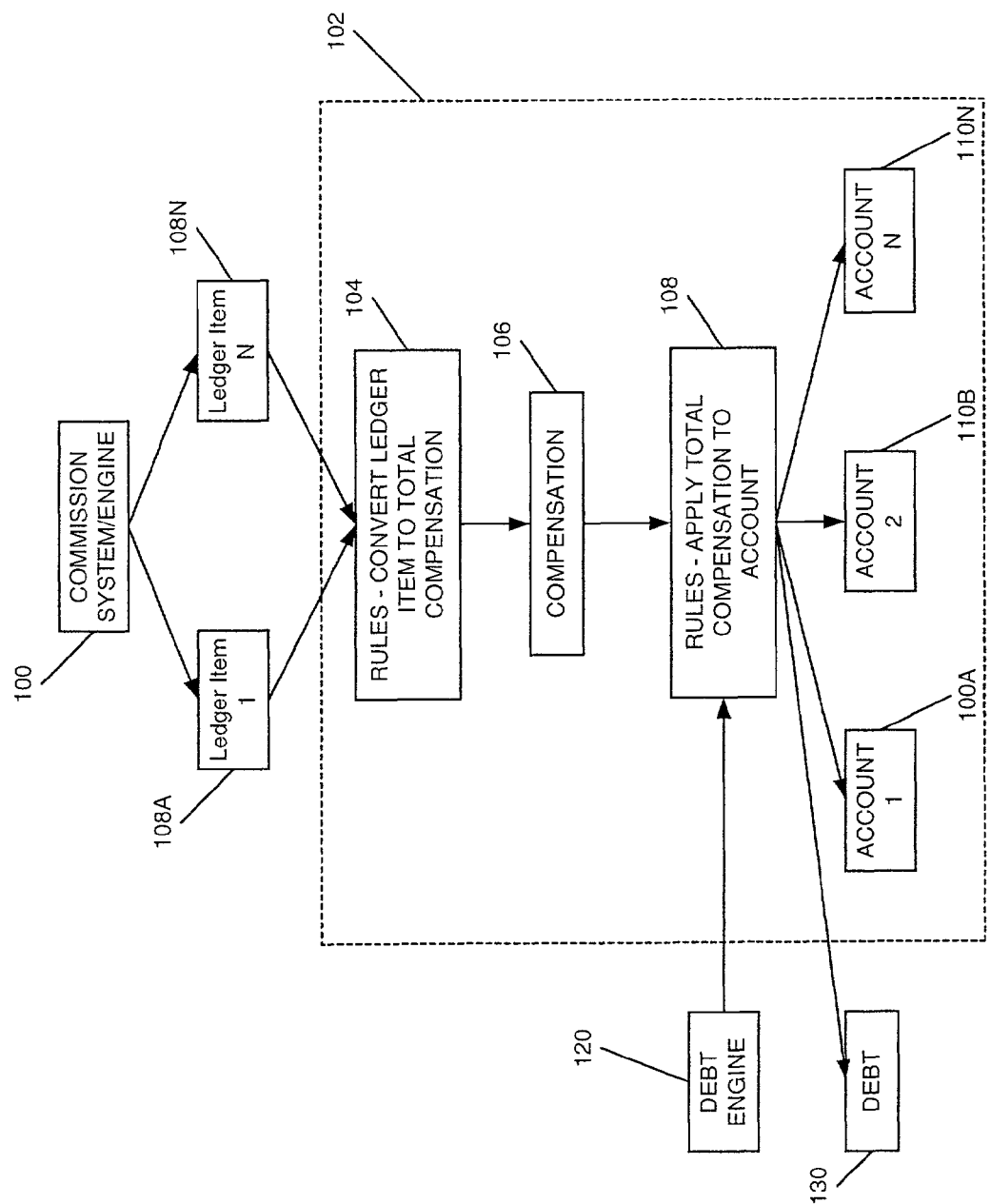
FIG. 1 is an illustration of a net-pay and debt management system in accordance with an embodiment of the present invention.

The invention is a method and apparatus for determining commission to be paid to a sales representative or sales team taking into account any debts associated with the sales representative or sales team. For example, an embodiment of the invention provides a method for a distributor to obtain debts and specify rules on payment of those debts which can be tracked back to the domain (e.g., agreements, rules, sale item, etc.). In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Embodiment of Object Model for Determining Commissions

The net pay debt management system may be coupled to a Commission System. The Commission System provides the ability to determine Commissions and amounts payable to sales representatives. The Commission System and commission model utilized in one or more embodiments of the invention is described in further detail in pending patent application Ser. No. 09/081,857, entitled "Method and Apparatus For Determining Commission", which in incorporated herein by reference.

Net-Pay Debt Management

One or more embodiments of the invention provide a method for consolidating net pay and debt management associated with different types of users (the term user may represent one or more parties, distributors, sales representatives, or managers). For example, the invention provides users with a mechanism for defining debts and specifying rules on payment of those debts. The payment of debts and distribution of money into one or more accounts may be tracked back to the domain (e.g., agreements, rules, sale item, etc.).

System Overview:

The functionality for performing such actions may be encapsulated into a debt management module and a net pay module (referred to collectively as a net pay debt management system). The debt management module enables the user to administer and maintain the issuance, transference, and recovery of debt (for example, advances, draws, or loans). In addition to encapsulating these debt rules, the debt management module also provides an automated process for advancing funds according to debt rules defined in the system.

The debt management module enables a financial services institution to manage party advances and repayments. With the debt management module, the user can define and manage the business rules and parameters associated with the approval and payment of advances. Users can also make adjustments to advance balances based on actual dollars received from commission and accelerate repayment schedules if commissions fall short. The debt management module also enables the user to define the rules and parameters associated with advances. In accordance with one embodiment of the invention, the user can utilize the debt management module to define at least the following items:

Classes of distributors who qualify for advances.

Qualification criteria for advances, such as the distributor's length of service, sales history, and past earnings.

Ratio of advances to projected income, taking into account any outstanding advances.

Repayment schedule and interest rate to be paid.
Source of repayment income or the policy the advance is to be recouped from.
Whether the amount is a percentage or flat rate.
Accelerated repayment schedules. For example, if a distributor's income projections fall below repayments, the user may wish to re-negotiate the repayment terms to accelerate them.

The debt management module also enables the user to perform activities such as initiate advances and repayment schedules and track performance of debts. The system identifies debts as performing or non-performing (no repayment activity). In one embodiment of the invention, the debt management module comprises a debt management viewer which enables the user to view debt management rules and data definitions, a debt management editor which manages debt management rules and data definitions. A debt management user with the appropriate level of authorization can review and approve financial debt management requests. The debt management engine automates the process of issuing and maintaining debt and may execute within a payment engine (described in further detail below) or individually instantiated and dispatched. In one embodiment of the invention the debt management module is executed as a background process (to perform routine debt management operations). However, users can also initiate the debt management process manually. When the debt management process executes it examines the states of financially related attributes of one or more parties managed by the system and makes debt-maintenance decisions based upon the predefined debt management rules active for each party.

One embodiment of the invention allows issuance of debt (e.g., advances, draws, or loans) for a party in a multiple step process. First the user has to set up debt issuance rules; these rules could apply to all parties in the system, group of parties or may be party specific. The user can also specify a rule based on some criteria in the object model. After setting up debt rules, debt could be issued to the party depending on their qualification. The system offers the flexibility to choose the method of payment for each debt being issued. Additionally, embodiments of the invention provide a method for approval of the debt, whereby debt repayment rules are introduced so that the debt could be repaid from the available earnings of the distributor. Debt collection mechanisms for defaulters are also provided.

In an embodiment of the invention the functions for consolidating net payment are incorporated into a net pay module. The net pay module enables financial institutions to track and calculate payments to distributors. Thus, the net pay module provides functionality for initiating payments to parties defined in the system. For example, the module may determine a party's net pay by adjusting the party's total earned compensation (calculated by the commission engine described above) according to a set of payment adjustment rules. These rules can be used to capture repayment schedules for outstanding debt, model IRS garnishing, and transfer payments to an alternate payee. In accordance with one embodiment of the invention this module also allows parties to split up net payments into individual disbursements and direct different parts of compensation to different accounts. In one embodiment of the invention, the net pay module is associated with a net pay viewer that enables system users to view payment rules and data definitions as well as a net pay editor which enables the user to manage payment rules and data definitions.

In one embodiment of the invention the net pay module comprises a payment engine that utilizes the ledger items created by the commission engine for a distributor as input. Thus, the payment engine is responsible for processing incoming compensation and debt issuances. For example, the payment engine may utilize ledger items to compute total compensation (i.e., payments) for the distributor, to distribute payments into accounts specified by the distributor, and to pay debts of the distributor. The payment engine may also provide the ability to split the total compensation for a party into various methods of payments. These splits can be tracked by adding various constraints (related to a financial industries business model). The system user (which may be an authorized party) has the flexibility to model or customize the payment rule/constraints. Payment splits support pay-outs to alternate payee from funds of a party. The user may specify deduction rules which can be applied to party earnings to facilitate deductions for items such as taxes, mutual funds etc. The system comprises global deduction components, which form the template for adding deduction rules for a party.

FIG. 1 illustrates the components of the net-pay and debt management system in accordance with an embodiment of the invention. Block 100 represents the commission system/engine and ledger items 1 through N (e.g. 108A through 108N) represent the outputs of commission engine 100. Ledger items 108A through 108N, which represent the earned compensation of a party, are fed to payment engine 102 for processing of payments related to the party. Each party's compensation is evaluated according to a set of rules associated with that party. For each applicable rule, modifications are made to the balance of the party's account and an audit object is created to record the transaction (e.g., amount, date, and reason for the adjustment). For example, payment engine 102 may take the earned compensation and processes it through a set of adjustment rules (e.g., rules specified by the party, government rules, industry rules, etc) to generate a compensation amount (i.e., net payment) 106 for a party (e.g., distributor). Upon completion of this processing an audit object representative of that transaction is created. Payment rules may also be applied to compensation amount 106 at block 108 to generate and disburse payments to accounts 110A through 110N, and further to pay debt 130 based on a set of rules defined by debt engine 120.

The payment rules illustrated at block 108 may define payments to certain accounts. For example, In one embodiment of the invention, these payments are then disbursed from the party's account balance according to the payment rules that dictate how payable sums are disbursed. External triggers may be implemented to provide custom functionality for the institution, for example. Thus, payment engine 102 processes incoming compensations (e.g., ledger items) and debt issuances into disbursable items for each party managed by the system. External systems such as cash accounting or general ledger systems can further process the disbursements.

The reader should note that compensation amount 106 may also be calculated subsequent to application of payment rules 108. Thus, the sequence of step 104, 106 and 108 is not fixed. In one embodiment of the invention, compensation amount 106 represents a subtotal or total amount of compensation to be paid to a party after various rules (e.g., adjustment rules and payment rules) are applied to the ledger items.

Payment Engine:

In accordance with one embodiment of the invention, payment engine 102 comprises processing logic and a flexible Application Programming Interface (API) that allows for processing of an arbitrary set of incoming transactions (e.g., comprising ledger items). Payment engine 102 may generate different payment scenarios of estimated payments from estimated compensation amounts. Payments may be retained in volatile memory until the user desires to commit the results to persistent storage. The processing performed by payment engine 102 applies the various set of rules applicable to a transaction. In one embodiment of the invention, payment processing comprises of compensation aggregation and payment generation.

A. Compensation Aggregation:

The compensation aggregation comprises examining incoming compensation items and making adjustments against those items. Thus, the compensation aggregation step involves making adjustments to a party's gross pay according to a set of predefined rules. Compensation aggregation also performs internal accounting to keep track of these adjustments. For example, at the compensation aggregation step the payment engine may examine a party's incoming compensation items such as unprocessed ledger items ( ) and unpaid debt issuances (e.g., advances, loans, draws) and apply adjustments to them to generate a set of outputs. The adjustments are applied according to a set of predefined rules referred to as payment rules and/or adjustment rules. Each transaction may be recorded so that an audit trail is maintained.

Figure 2:
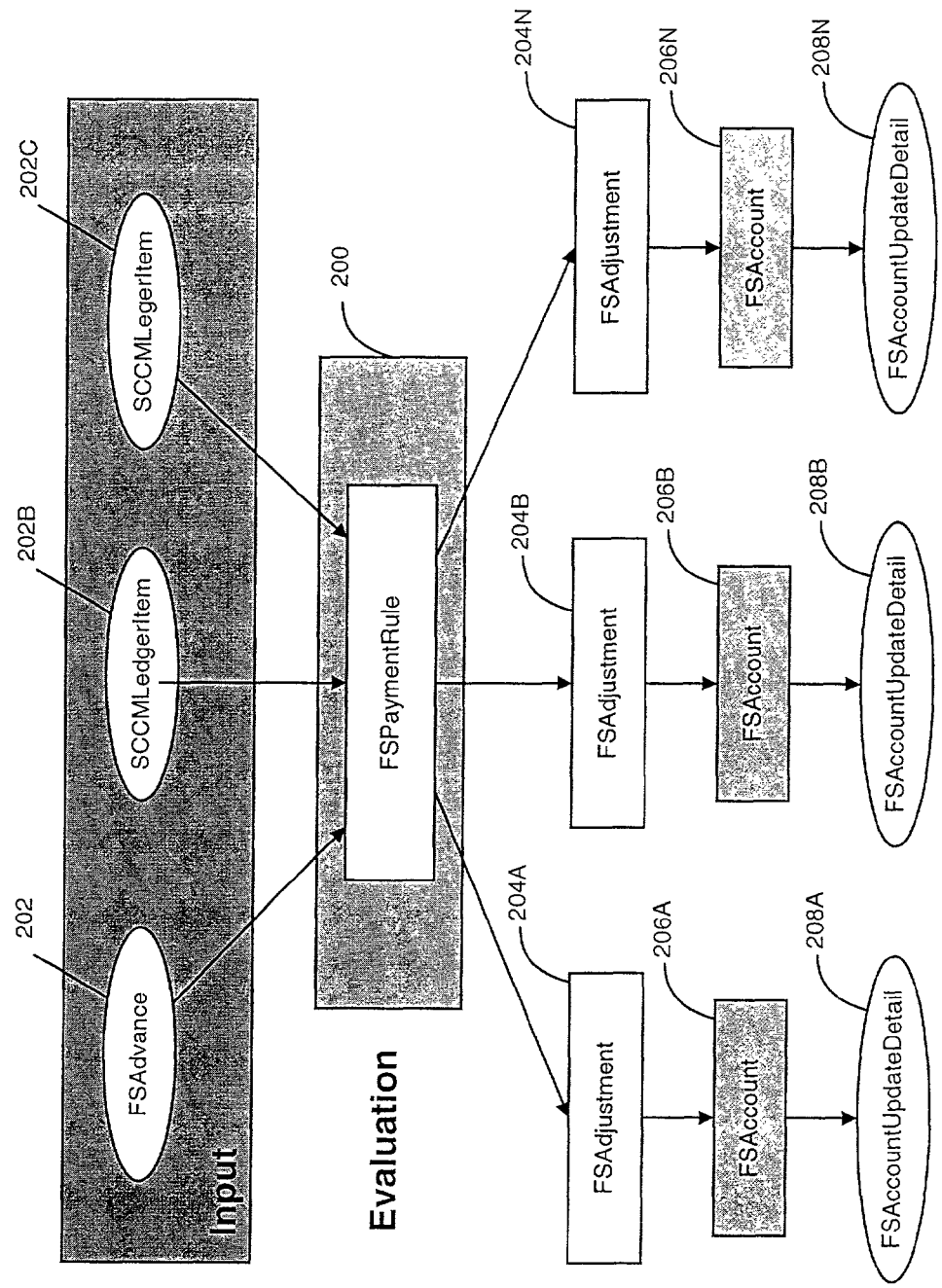
FIG. 2 is an illustration of a payment engine processing in accordance with an embodiment of the present invention.

FIG. 2 comprises an illustration of the payment engine processing in accordance with one embodiment of the invention. Each incoming compensation item, such as SCCM-LedgerItem or FSAdvance 202, may be evaluated against the complete set of the party's active payment rules, FSPaymentRule 200. FSPayment Rule 200 may contain the payment rules and/or adjustment rules mentioned above with respect to FIG. 1. Thus, the term rule is used to generally refer to both types of payment rules. For each rule that evaluates to true, all of the rule's adjustments, e.g., FSAdjustment 204A-204N, are processed against the compensation item. When an adjustment executes, the adjustment's formula may be evaluated to determine the monetary amount for the adjustment. For example, if the monetary amount of the adjustment is non-zero, the amount is deposited into the associated account, e.g., FSAccount 206A-206N, and a record is created to record the movement of the funds (e.g., FSAccountUpdateDetail 208A-208N). If the full amount of each incoming compensation item is not accounted for by the applicable adjustments, an embodiment of the invention contemplates making a default adjustment. If the payment engine is set up to use default accounts, these leftover funds may be deposited into the party's default FSAccount. Now that the payment engine has calculated each party's net payable amount, the system determines how to disburse these funds.

B. Payment Generation:

Payment generation iterates over the payable funds identified during aggregation and routes them to one or more payment methods as defined by a set of payment split formulas. The input to this phase of processing may comprise a collection of accounts from which disbursements may be generated. During processing, each FSAccount is examined by the associated party's FSFinancialInfo object which encapsulate the split formula.

Figure 3:
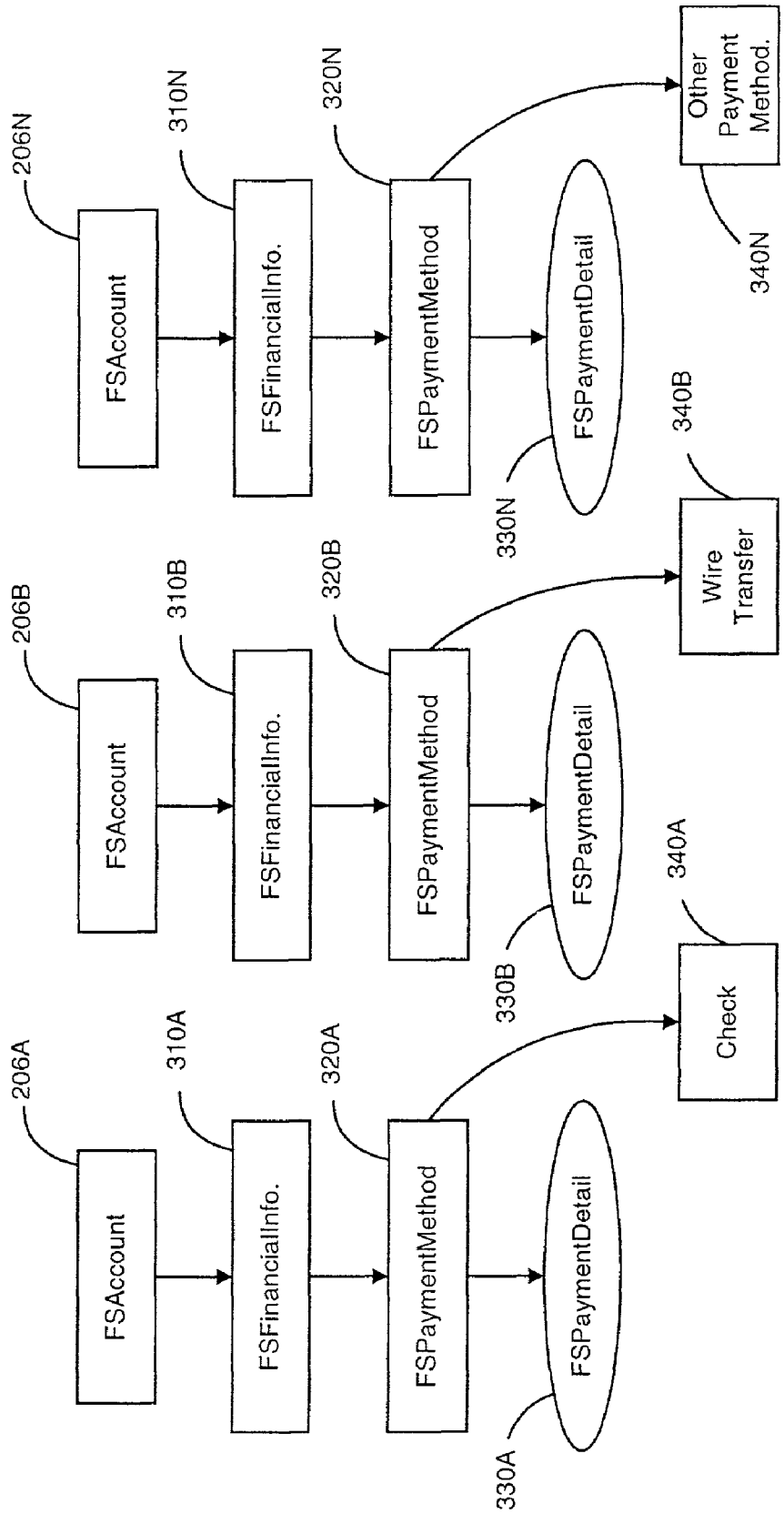
FIG. 3 is an illustration of a payment generation method in accordance with an embodiment of the present invention.

From the FSAccount (e.g., 206A-206N), payments are made according to methods specified in a party's financial information database (e.g., split formulas). FIG. 3 illustrates a payment generation method in accordance with an embodiment of the invention. In one embodiment of the invention, the payment generation engine executes a method that operates on the collection of accounts, e.g., FSAccount 206A-206N, from which disbursements may be generated. FSFinancialInfo (e.g., 310A-310N) examines each FSAccount 206 to determine whether any amount need be transferred according to a particular payment method (e.g., Check 340A, Wire Transfer 340B, or any other Payment Method 340N). For example, FSAccount 206A may be processed by FSFinancialInfo 310A. If a non-zero amount is returned, the funds accrue in FSPaymentMethod 320A until all accounts (e.g., FSAccount 206A-206N) have been processed for the party. After processing, a disbursement (e.g., check 340A) is initiated from the payment method if the payment method is a disbursable state. For example, external triggers may be invoked to perform outside processing of the disbursement. If the disbursement is successful, FSDisbursement 330A is created to record the event, otherwise an FSPaymentException is created to record the exception. All funds not routed from an FSAccount may be disbursed according to a default payment method, where one exists; otherwise the unaccounted funds may remain in the FSAccount.

C. Net Pay API:

In one embodiment of the invention the functionality associated with net pay module is incorporated into an Application Programming Interface (API). A brief discussion of the API is contained in Appendix A.

Debt Management Engine:

The administration of the issuance, transference, and recovery of debt is performed by the debt management engine 120 (see e.g., FIG. 1). Debt management engine also provides automated processes for advancing funds according to debt rules defined in the system. The debt management engine can be run from within the payment engine or individually instantiated and dispatched. In on embodiment of the invention, debt management engine runs as a background batch process (to perform routine debt maintenance operations). However, the debt management engine may also be executed manually. The debt management engine provides the ability to examine the states of financially related attributes on one or more parties managed by the system and may make debt maintenance decisions based upon the debt management rules active for each party. For example, the debt management engine may comprise code (e.g., FSDebtManagementRule object) that access a set of rules (e.g., rule objects) that encapsulate a formula that identifies a condition and an associated action performed when the condition the rule relates to is met. During the rule evaluation process embodiments of the invention may determine whether to 1) issue new debt, 2) transfer debt between accounts, or 3) identify exceptional conditions and firing an event for external handling.

Figure 4:
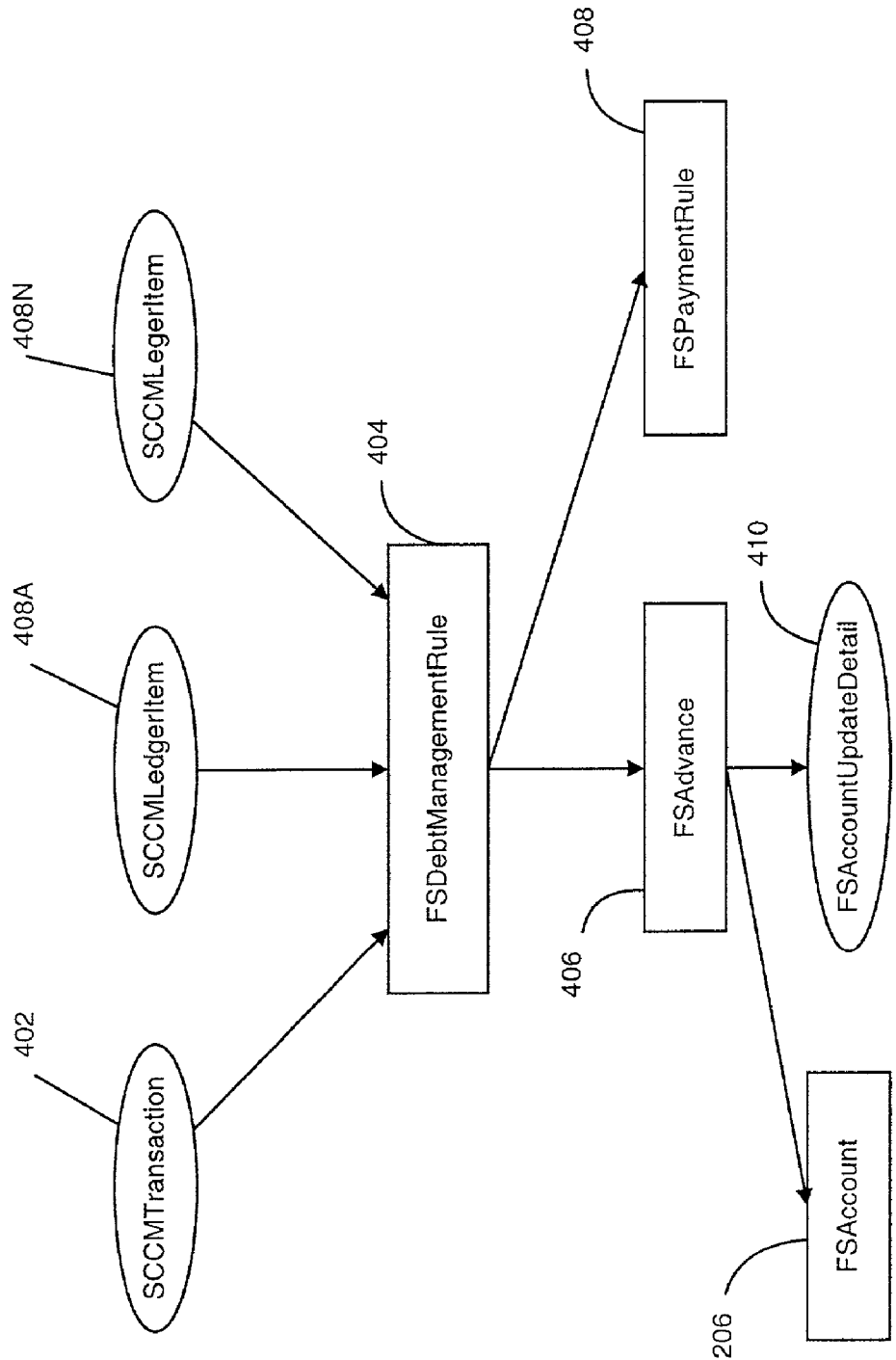
FIG. 4 is an illustration of a debt issuance object flow in accordance with an embodiment of the present invention.

A. Issuing New Debt:

In one embodiment of the invention rules may define how much debt to issue. For instance, rules that determine the maximum debt allowed for a given party may be incorporated into the debt management engine. FIG. 4 is an illustration of the debt issuance object flow in accordance with an embodiment of the present invention. Each instance of debt management rule object 404 encapsulates a formula that identifies a condition and an associated action to be performed when the condition is met. The debt issuance rules determine the maximum debt for any given party based on the input ledger items and type of transaction 402. When a debt issuance rule evaluates to true, the debt is issued (e.g., FSDebt is created), and FSPaymentRule 408 is created to hold the repayment criteria for the new debt. The new debt is processed according to existing payment rules (e.g., the system picks up the FSDebt during the next payment engine cycle and processes it according to the existing payment rules). The debt engine may evaluate the FSPaymentRule during this pay cycle and all following ones until the debt is fully repaid. For automatic rules, the payment engine creates an advance, FSAdvance 406, for the amount and the money is automatically transferred according to existing payment rules. Finally, a detail report of the transaction is recorded in FSAccountUpdateDetail object 410. FSPaymentRule 408 is continuously evaluated until the debt is fully repaid. Default payment rules that serve as base repayment rules for new debts may be included in FSDebtManagementRule 404. If you specify a default repayment rule on the FSDebtManagementRule issuing this debt, that rule is cloned as the base repayment rule for the new debt. After the FSDebt is created, it is passed to the OnIssuance call to tie into custom logic.

Figure 5:
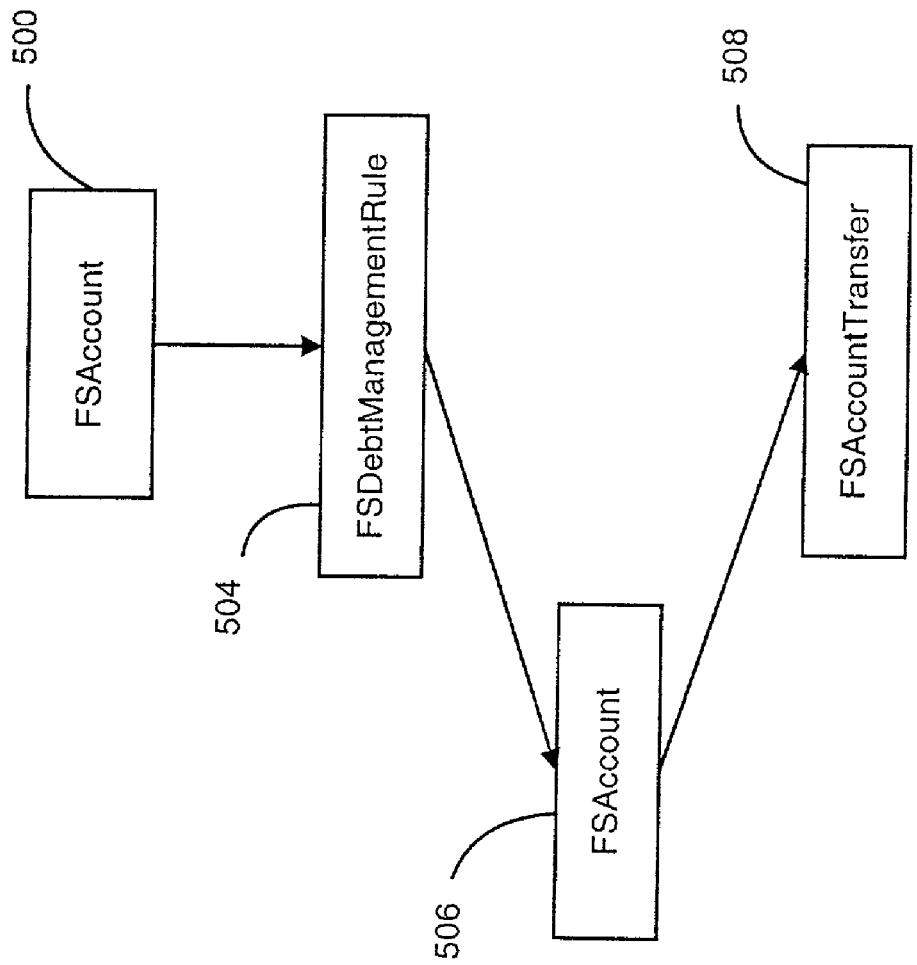
FIG. 5 is an illustration of a debt transfer object flow in accordance with an embodiment of the present invention.

B. Transferring Debt:

Funds may be transferred from one account to another based on some transfer set of rules. FIG. 5 is an illustration of the debt transfer object flow in accordance with an embodiment of the invention. For example, debt may be transferred from account FSAccount 500 to FSAccount 506 when debt-transference rule, FSDebtManagementRule 504, evaluates to true. In one embodiment of the invention, the transfer occurs instantaneously, but may occur any time subsequent to the occurrence of the test. Upon transfer, the transaction may be recorded using FSAccountTransfer object 508.

C. Identifying Conditions:

The debt engine may use condition-type debt management rules to identify situations in which special attention and/or further processing is required. For example, condition rules can be constructed to identify delinquent debt balances and other exceptional conditions.

D. Debt Management API:

In accordance with one embodiment of the invention, the debt management engine is configured to perform either automated or manual processing of the debt rules. However, the invention contemplates the user of other processing techniques (e.g., semi-automatic), the automated and manual instances will be described herein for illustrative purposes. Automated processing passes incoming transaction, ledger items, and account objects into the debt management rules for evaluation so that the system can efficiently react to new financial data as it arrives. In addition to directly acting upon these objects, the entire state of any associated system is considered. Manually initiated processing does not directly operate upon any object, but instead relies on its rules (e.g., through SCFormula evaluation) and on engine callouts to gather information necessary for processing debts.

In one embodiment of the invention, each payment and/or debt rule has an SCFormula object associated with it that when evaluated results in some value, for example, a numeric value. The evaluated result is passed to a method call to an external event handler for additional and/or optional processing. For example, the handler may check regulatory rules, licenses, and appointments before returning a response to the debt management engine. If the evaluated rule is an automatic type rule, the payment engine creates an advance for the amount returned by the external call. However, if the rule is not automatic, the value returned by the external call may be used to limit the amount for which a manual advance may be issued.

The debt management system automates the process of issuing and maintaining debt by examining the states of financially related attributes on one or more parties managed by the system and making decisions based upon predefined rules active for each party.

E. Alternate Payee:

The payment engine provides method for an Alternate Payee party to receive pay instead of the party who earned the compensation. The alternate payee might be a manager, for example, who is receiving compensation for sales during a distributor's training period. Before a party can become an alternate payee, that party must be assigned an Alternate Payee role and an Alternate Payee Relationship (e.g., FSAlternatePayeeRelationship object) must be created which links the two parties (the manager and the trainee) together.

A distributor can then select an alternate payee to receive some or all of the distributor's compensation (according to a formula) by creating an FSFinancialInfo object that references the payment method on an FSAlternatePayeeRelationship. In some cases, it may be necessary to check if an alternate payee is licensed or appointed to sell a product before issuing payment from funds generated by the sale of the product. This check can occur within the InitiatePayment method on the alternate payee's payment method. If this check fails, then payment is halted and an FSPaymentException object may be recorded to capture this exception.

In one embodiment of the invention the functionality associated with the debt management engine (debt module) is incorporated into an Application Programming Interface (API). A brief discussion of the API is contained in Appendix B.

Embodiment of Computer Execution Environment (Hardware)

Figure 6:
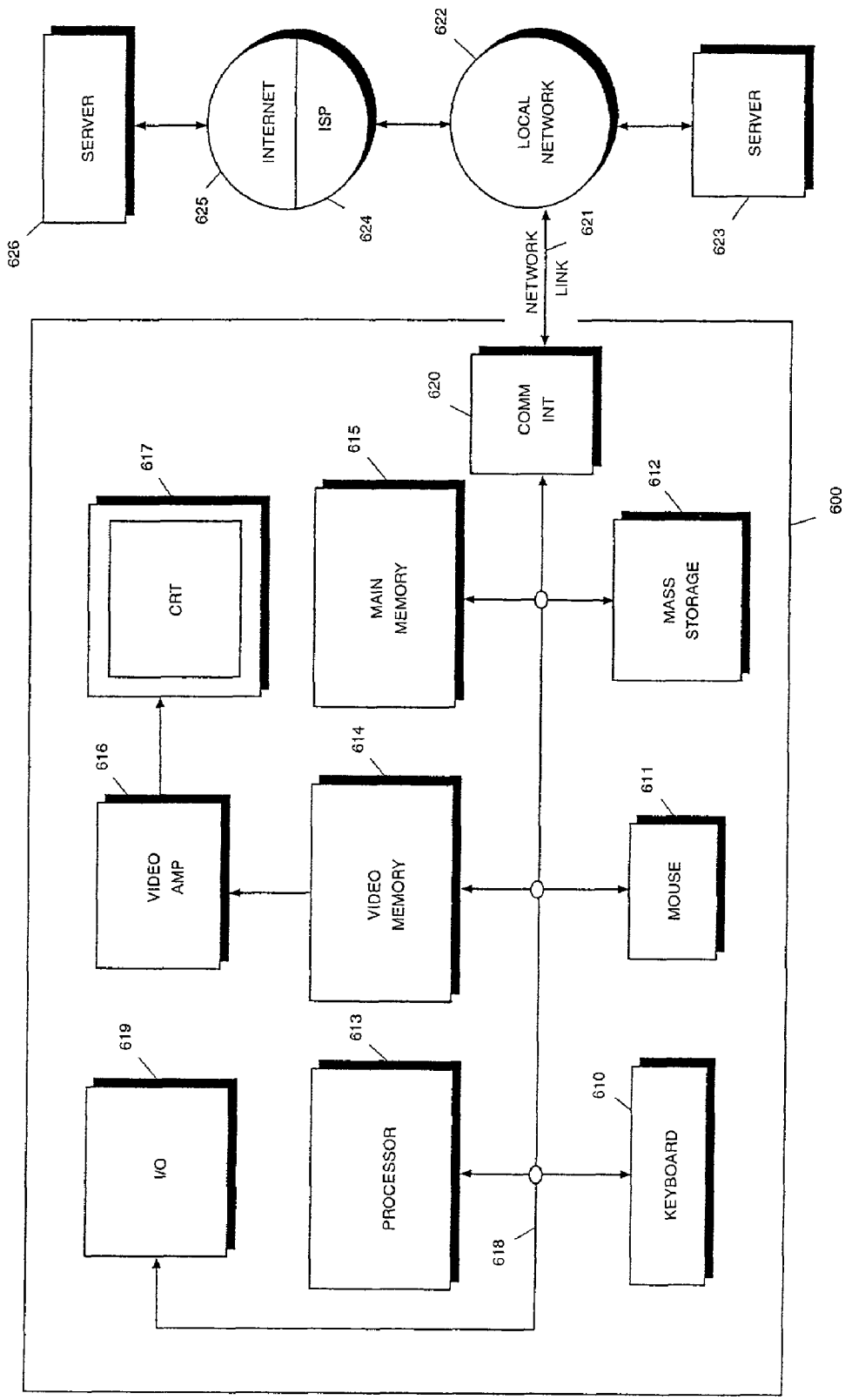
FIG. 6 illustrate is an illustration of a computer environment in which one or more embodiments of the invention may be implemented.

An embodiment of the invention can be implemented as computer software in the form of computer readable code executed on a general purpose computer such as computer 00 illustrated in FIG. 6, or in the form of bytecode class files running on such a computer. A keyboard 610 and mouse 611 are coupled to a bidirectional system bus 618. The keyboard and mouse are for introducing user input to the computer system and communicating that user input to processor 613. Other suitable input devices may be used in addition to, or in place of, the mouse 611 and keyboard 610. I/O (input/output) unit 619 coupled to bidirectional system bus 618 represents such I/O elements as a printer, A/V (audio/video) I/O, etc.

Computer 600 includes a video memory 614, main memory 615 and mass storage 612, all coupled to bi-directional system bus 618 along with keyboard 610, mouse 611 and processor 613. The mass storage 612 may include both fixed and removable media, such as magnetic, optical or magnetic optical storage systems or any other available mass storage technology. Bus 618 may contain, for example, thirty-two address lines for addressing video memory 614 or main memory 615. The system bus 618 also includes, for example, a 32-bit data bus for transferring data between and among the components, such as processor 613, main memory 615, video memory 614 and mass storage 612. Alternatively, multiplex data/address lines may be used instead of separate data and address lines.

In one embodiment of the invention, the processor 613 is a microprocessor manufactured by Motorola, such as the 680×0 processor or a microprocessor manufactured by Intel, such as the 80×86, or Pentium processor. However, any other suitable microprocessor or microcomputer may be utilized. Main memory 615 is comprised of dynamic random access memory (DRAM). Video memory 614 is a dual-ported video random access memory. One port of the video memory 614 is coupled to video amplifier 616. The video amplifier 616 is used to drive the cathode ray tube (CRT) raster monitor 617. Video amplifier 616 is well known in the art and may be implemented by any suitable apparatus. This circuitry converts pixel data stored in video memory 614 to a raster signal suitable for use by monitor 617. Monitor 617 is a type of monitor suitable for displaying graphic images.

Computer 600 may also include a communication interface 620 coupled to bus 618. Communication interface 620 provides a two-way data communication coupling via a network link 621 to a local network 622. For example, if communication interface 620 is an integrated services digital network (ISDN) card or a modem, communication interface 620 provides a data communication connection to the corresponding type of telephone line, which comprises part of network link 621. If communication interface 620 is a local area network (LAN) card, communication interface 620 provides a data communication connection via network link 621 to a compatible LAN. Wireless links are also possible. In any such implementation, communication interface 620 sends and receives electrical, electromagnetic or optical signals which carry digital data streams representing various types of information.

Network link 621 typically provides data communication through one or more networks to other data devices. For example, network link 621 may provide a connection through local network 622 to local server computer 623 or to data equipment operated by an Internet Service Provider (ISP) 624. ISP 624 in turn provides data communication services through the world wide packet data communication network now commonly referred to as the "Internet" 625. Local network 622 and Internet 625 both use electrical, electromagnetic or optical signals which carry digital data streams. The signals through the various networks and the signals on network link 621 and through communication interface 620, which carry the digital data to and from computer 600, are exemplary forms of carrier waves transporting the information.

Computer 600 can send messages and receive data, including program code, through the network(s), network link 621, and communication interface 620. In the Internet example, remote server computer 626 might transmit a requested code for an application program through Internet 625, ISP 624, local network 622 and communication interface 620. In accord with the invention, one such application is that of determining the commission to be disbursed to a sales representative.

The received code may be executed by processor 613 as it is received, and/or stored in mass storage 612, or other non-volatile storage for later execution. In this manner, computer 600 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Utilization of Computer Software:

In one embodiment of the invention, computer software that utilizes multiple related functions and data structures is utilized. To encapsulate these related functions and data structures, one embodiment of the invention utilizes a standard object oriented programming (OOP) language approach. To provide an understanding of encapsulation of related data structures and methods, an overview of object-oriented programming is provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214-223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class.

An object is a generic term that is used in the object-oriented-programming environment to refer to a module that contains related code and variables. A software application can be written using an object-oriented programming language whereby the program's functionality is implemented using objects. The encapsulation provided by objects in an object-oriented programming environment may be extended to the notion of transactions, allocations, quotas, quota details, quota states, and promotions as discussed below.

In one embodiment of the invention, a shell object mechanism is utilized to store and provide access to objects and data. Such a mechanism is discussed in detail in pending U.S.

patent application Ser. No. 08/931,878 entitled "Method and Apparatus for Providing Peer Ownership of Shared Objects" which is hereby incorporated by reference.

Thus, a method and apparatus for consolidating payment and debt management is described in conjunction with one or more specific embodiments. The invention is defined by the claims and their full scope of equivalents.

APPENDIX A

A brief discussion of the API implementing aspects of the net pay module in accordance with one or more embodiments of the invention will now be described. The API provides a way to invoke the payment engine and may be utilized by the engine to call external logic.

A. Engine Setup:

In one embodiment of the invention, the payment engine class, (e.g., com.company.fs.payment.engine.FS-PaymentEngine), provides two constructors:
  public FSPaymentEngine(ISCManager mgr, String stateID)
  public FSPaymentEngine(ISCManager mgr)
mgr comprises the registered backbone manager that should be used by the payment engine. stateID is the ID of the FSPaymentEngineState object that is being used to record payment engine run sequences. Typically, the designing user should not need to use the constructor, which explicitly specifies the state id.

B. Methods:

In one embodiment of the invention, the following methods offering operating options may be set once an instance of the engine is created.
  public void setLogLevel(int level)
    Sets the logging level of the persisted log. A value of 0 may only log critical errors. value of 12 will log every detail.
  public void setConsoleLevel(int level)
    Sets the logging level of messages output to stdout. See setLogLevel for a discussion of legal log levels.
  public void setLogTimes(boolean val)
    SetS whether or not timing information should be recorded in the engine log. Defaults to true.
  public void setLogFilename(String name)
    Set the filename of the engine log.
  public void setUseDefaultAccount(boolean val)
    Sets whether or not the engine should use default accounts (see Compensation Aggregation section).
  public void setUseDefaultPayMethod(boolean val)
    Sets whether or not the engine should use default payment methods (see Payment Generation section).
    Compensation Aggregation
    Example
      public int Aggregate(ISCCollection ledgerItems, ISCCollection debts, ISCCollection parties)
ledgerItems and debts contain all of the SCCMLedgerItem and FSDebt objects that should be processed during this engine run. For best performance, these collections should be grouped according to FSParty (that is, all of the ledger items for a given party are contiguous within the collection). parties is an optional collection provided for performance enhancement. If it is non-empty, its contents will be batch faulted prior to any processing. In one embodiment of the invention, the payment engine assumes that the ledger items and debts it receives as input have not already been processed for payment. When using this interface, it is the caller's responsibility to ensure that only unprocessed items are passed in.

A secondary, simple interface is provided for launching the Compensation Aggregation phase when it is desired that all unprocessed compensation items should be processed:
  public int Aggregate( )
  This interface automatically queries for all unprocessed ledger items and debt issuances and passes the results on to the previous interface.

C. Payment Generation:

The call for initiating the Payment Generation phase of payment processing in accordance with one embodiment of the invention is: public int GeneratePayments(ISCCollection accounts). accounts contains all of the FSAccount's that should be processed for payment generation during this engine run. In one embodiment of the invention, for correct disbursement operation, the accounts collection must me grouped by party.

A convenience interface is also provided that automatically passes in all eligible accounts into the above method call: Public int GeneratePayments( ). Calling this method in accordance with one embodiment of the invention will generate payments for all accounts whose payable flag is true and pended flag is false.

Examining/Committing Results

When each phase of the engine runs, results (modified objects and new objects) are stored in internal collections and are not automatically committed to persistent storage. The following methods should be used to examine the results of an engine run and commit this data.

Methods
  public void Commit( )
    Commits all modifications (object changes and new objects) to disk.
  public void Reset( )
    Refreshes all modified objects, clears the new objects collection, and resets all internal state of the engine.
  public void ClearChanges( )
    Removes all objects from the internal modified objects and new objects collections, but does not refresh the modified objects from disk.
  public ISCCollection GetModified( )
    Returns a heterogeneous collection containing all modified and new objects. The collection may contain objects of types ISCCMLedgerItem, IFSDebt, IFSPaymentMethod, IFSPaymentDetail, IFSPaymentException, IFSDisbursementDetail, IFSAccount, and IFSAccountUpdateDetail.
  public ISCCollection GetModifiedObjects( )
    Returns a heterogeneous collection containing only modified objects. This does not contain those objects created by the engine. This collection may contain objects of types ISCCMLedgerItem, IFSDebt, IFSPaymentMethod, and IFSAccount.
  public ISCCollection GetNewObjects( )
    Returns a varied collection containing only the new objects that were created by the engine. The collection does not contain those objects modified by the engine. It may contain objects of these types:
    IFSDebt, IFSPaymentDetail, IFSPaymentException
    IFSDisbursementDetail, and IFSAccountUpdateDetail.
  Engine Callouts During engine processing, there are many points at which external logic may be executed. These integration points are implemented as backbone method providers. In order to integrate with external logic, one or more of the following providers should be overridden.

IFSPaymentRule.AllowAdjustment
boolean IFSPaymentRule.AllowAdjustment(IFSPaymentRule rule, ISCObjectBase obj, double BaseAmount, double RemainingAmount)

AllowAdjustment is called after each true evaluation of an FSPaymentRule, before any of its associated adjustments are evaluated. If the call returns true, execution continues with adjustment processing. If the call returns false, adjustment processing is skipped and execution continues with the evaluation of the next payment rule.

IFSPaymentRule.OnAdjustment
public void IFSPaymentRule.OnAdjustment(IFSPaymentRule rule, ISCObjectBase obj, double BaseAmount, double RemainingAmount)

OnAdjustment is called after all of an FSPaymentRule's associated adjustments have been processed for a given compensation item.

IFSAdjustment.AllowAccountUpdate
public boolean IFSAdjustment.AllowAccountUpdate(IFSAdjustment me, IFSPaymentRule rule, double amount)

AllowAccountUpdate is called for each FSAdjustment that evaluates to a non-zero amount for the current compensation item. If the call returns true, the associated FSAccount is updated and an FSAccountUpdateDetail object is created to record the update. If the call returns false, further processing of this adjustment is skipped and the associated FSAccount is not updated.

IFSAdjustment.OnAccountUpdate
public void IFSAdjustment.OnAccountUpdate(IFSAdjustment me, IFSPaymentRule rule, IFSAccountUpdateDetail det)

OnAccountUpdate is called each time an FSAdjustment updates an FSAccount.

IFSAccount.AllowPayment
public boolean IFSAccount.AllowPayment(IFSAccount me, IFSFinancialInfo fininfo, IFSPaymentMethod method, double amount)

AllowPayment is called each time a split formula (IFSFinancialInfo) evaluation returns a positive value. If the call returns true, the associated amount is transferred from the current FSAccount to the associated FSPaymenyMethod and an FSPaymentDetail is created to record the transaction. If the call returns false, further processing of this split is skipped and the associated account and payment method are not updated.

IFSAccount.OnPayment
public void IFSAccount.OnPayment(IFSAccount me, IFSFinancialInfo fininfo, IFSPaymentDetail detail)

OnPayment is called each time a payment split transfers funds from an FSAccount to the balance on an FSPaymentMethod.

IFSPaymentMethod.InitiatePayment
public double IFSPaymentMethod.InitiatePayment(IFSPaymentMethod me, IFSDisbursementDetail detail)

InitiatePayment is called each time the system processes an FSPaymentMethod for disbursement. The method should tie in to an external disbursement system and return the actual amount disbursed.

Classes in the Net Pay Module:
The following section lists and describes the classes included in the Net Pay Module in accordance with one embodiment of the invention.

FSPaymentProfile
The FSPaymentProfile class links an FSParty in the system with the set of rules that dictate how payments should be processed for the party.

Ruleset Objects
This collection of FSPaymentRule objects defines what adjustments need to be made to the incoming payment request.

FSPaymentRule
The FSPaymentRule class maps a set of rules (described by an SCFormula) to payment adjustments that need to fire when a given rule evaluates to true.

Rule
This SCFormula describes the condition in which the associated adjustment should fire. For example, if an adjustment should fire only when the agreement name equals My Special Agreement and the date is after April 15, the formula would contain the following expression:
(Agreement.Name='My Special Agreement') && (Date>#04/15/2000#)

RuleType
This enumerated property identifies what type of payment ruleset this is. Valid values for this property are PAYMENT (signifying a ruleset used to generate payments) and REPAYSCHEDULE (marking the ruleset as a repayment schedule).

Adjustments
This collection contains the FSAdjustment instances which define the adjustments that should take place if the Rules property evaluates to true.

Priority
The relative priority of this payment ruleset in relation to other, possibly contending rulesets. Higher priority (1 is highest) rulesets are evaluated before lower priority rulesets during payment calculation.

OnAdjustment( )
This event trigger is called each time an adjustment fires. If this event returns false, the adjustment does not execute. You can override this method for custom adjustment processing.

FSAdjustment
An FSAdjustment contains information related to crediting or debiting a single account, although it does not record an actual adjustment event. When an account is adjusted, an FSAccountUpdateDetail object is created to record a history of this account transaction.

Name
A descriptive name for this adjustment type.

UpdateAccount
This is a reference to the FSAccount that is updated when this adjustment is activated.

Formula
This SCFormula object defines the calculation used to determine how much money should move with this adjustment.

OnAccountUpdate( )
This event trigger is called each time an account is updated. Funds are moved only if this event completes successfully (returns true). You can override this method for custom account processing.

FSAccount
An FSAccount is an in-system repository for various fund amounts. One party may have multiple accounts. For example, a particular party may have an Advance account and an Earned Compensation account whose balances reflect the amount advanced to and earned by the party. Alternatively, a party may have many system accounts that map to individual policies, components, and agreements.

Name
: A descriptive name for this account.

Balance
: The balance of this account. If this account maintains the status of advanced or drawn funds, the balance may be negative.

Agreement
: (Optional) The agreement with which this account is associated.

Component
: (Optional) The Compensation Component with which this account is associated.

Party
: The party with which this account is associated.

Policy
: (Optional) The Policy with which this account is associated.

Product
: (Optional) The Product with which this account is associated.

FSAccountUpdateDetail

The FSAccountUpdateDetails object contains adjustment information for FSAccount objects. Whenever the system modifies the balance of an FSAccount, it creates an FSAccountUpdateDetail object.

Account
: A reference to the modified account.

Amount
: The amount by which the balance of the associated account was adjusted.

UpdateDate
: The date this update occurred.

Adjustment
: The adjustment that created this update.

FSFinancialInfo

The FSFinancialInfo class maps an individual payment method to a condition that triggers the execution of that payment method. FAgreementRelationship and FSParty classes currently maintain collections of FSFinancialInfo objects.

SplitFormula
: This is the SCFormula that determines when and how much money should be paid using the associated payment method.

PaymentMethod
: This is a reference to the FSPaymentMethod that should be used to compensate the owner of this FSFinancialInfo object according to the rules defined in the associated SplitFormula.

Priority
: The relative priority of this FSFinancialInfo object in relation to other, possibly contending instances. Higher priority (1 is highest) objects are processed before lower priority objects during payment calculation FSPaymentMethod This is the base class for defining various methods of payment. It defines an interface, InitiatePayment( ) for initiating the disbursement of funds.

Balance
: The undisbursed money for this payment method.

PayFrequency
: This enumerated property identifies how often payment should occur from this payment method.

PayWindow
: The length in days around a specified pay date in which a payment can occur.

LastPayDate
: The last date a payment was initiated from this payment method.

MinPayThreshhold
: The minimum balance required for this payment method to issue a payment.

MaxPayThreshhold
: The maximum amount that can be disbursed at one time from this payment method. If this value is reached, the system creates an FSPaymentException.

InitiatePayment( )
: This method is called when the payment method executes. If this method fails (returns false), the system creates an FSPaymentException to record this situation and the payment accrues in the Balance property. The supplied implementation of this method is a null operation. This method is typically overridden during product deployment.

FSPaymentDetail

The FSPaymentDetail class records the issuance of a single payment. The system creates an FSPaymentDetail whenever an FSPaymentMethod executes successfully.

Account
: The account from which the payment originated.

Amount
: The amount of this payment.

PaymentDate
: The date of this payment.

PayMethod
: A reference to the FSPaymentMethod that generated this payment.

FSPaymentException

The FSPaymentException class records an exception that occurs during the payment cycle. There are only two situations in which the system creates exceptions. If the amount exceeds the MaxPayThreshhold of an FSPaymentMethod, or if the InitiatePayment( ) method of an FSPaymentMethod returns false, thereby blocking payment.

Date
: The date this exception occurred.

Type
: The type of exception, such as InitiatePaymentFailed or MaxThreshholdExceeded.

Reason
: The reason this exception was thrown, for example, Party is not licensed for this product.

Amount
: The amount of compensation associated with the transaction that generated the exception.

PayMethod
: The FSPaymentMethod that generated the exception.

SCFormula Properties in Net Pay

In the Payment module, as in the Debt Management module, the system uses SCFormula objects to model a variety of rules. For more information, see SCFormula Properties in Payment and Debt Management Objects.

Alternate Payee Parties

The Payment module allows for alternate payees.

APPENDIX B

A brief discussion of the API implementing aspects of the debt management functionality described herein in accordance with one or more embodiments of the invention will now be described. The API provides a way to invoke the debt management engine.

Introduction to Debt Management API:

This section details the objects used in Debt Management processing. There are two means of processing: automatic and manual. Though the core rule-evaluation engine is the same for both, automated (batch) operations and manually initiated processing make use of different interfaces to invoke debt processing.

Automated processing passes incoming transaction, ledger item, and account objects into the debt management rules for evaluation so that the system can efficiently react to new financial data as it comes in. In addition to directly acting upon these objects, the entire state of the DMS system is considered by evaluating the SCFormula method (from within individual debt management rules) and engine callouts.

Manually initiated processing, however, does not directly operate upon any objects. Instead, it relies solely on its rules (through SCFormula method evaluation) and on engine callouts to gather the information necessary for processing debts.

Setting up the Debt Manager:

The FSPEDebtManager class is used for both run time rule evaluation (used for manually-initiated debt management) and for automated batch processing. The constructor for this class is:

public FSPEDebtManager(ISCManager mgr, ISCCollection mods, ISCCollection news, int run)
        mgr is the registered backbone manager that should be used for the engine run.
        mods and news are optional collections that the engine should use to store references to modified and newly created objects.
        run is the sequence ID of this engine run.

Manual Processing:

During manual processing, the debt engine evaluates only those debt rules whose run time property is true. The interface for this form of processing allows only for the issuance of debt.

To check for the maximum allowable issuance amount for a given party, instantiate FSPEDebtManager and call:

public double IssuanceCheck(IFSParty party, ISCAttributes args)

Automatic Processing:

The DMS software can invoke automatic processing of debt management rules from either the payment engine, or directly from an instance of FSPEDebtManager. However, during engine processing, only those debt rules whose Automatic property is true are evaluated.

Both the payment and the debt management classes provide the following interface for launching the debt engine:

public int ProcessDebt(ISCCollection ledgers, ISCCollection transactions, ISCCollection accounts, ISCCollection parties)

The ledgers, transactions, and accounts collections contain the objects passed as arguments to the debt rules during processing. The parties collection is an optional argument used to batch-fault the parties into memory.

Note: The ledgers, transactions, and accounts collections may be grouped by party for optimal performance.

The payment engine additionally provides a convenience method for debt processing invocation that queries for all ledger items and transactions that have not yet been processed by the debt engine and passes them into the ISCCollection interface:

public int ProcessDebt( )

Engine Callouts:

During engine processing, there are many points at which the system executes external logic. These integration points are implemented as backbone method providers on FSDebtManagementRule. In order to integrate with external logic, one or more of the following providers should be overridden.

IFSDebtManagementRule.CheckExternalRules
    public double CheckExternalRules(IFSDebtManagementRule rule, ISCObjectBase obj, double amount)

The system calls CheckExternalRules after evaluating the FSDebtManagementRule. The value returned from the rule evaluation is amount and obj is the object passed into the formula for evaluation. This method needs to return the amount, possibly modified, that the rule should use in subsequent processing. The method should return 0.0 to halt further processing of the rule for the current evaluation object. The default implementation simply returns amount.

IFSDebtManagementRule.AllowIssuance
    public boolean AllowIssuance(IFSDebtManagementRule me, ISCObjectBase obj, double amount)

The system calls AllowIssuance when an issuance rule and the subsequent call to CheckExternalRules evaluate to a non-zero value. If the call returns false, the debt issuance is cancelled and processing resumes with the next available rule evaluation. If the call returns true, the system issues the debt IFSDebtManagementRule.OnIssuance
    public void OnIssuance(IFSDebtManagementRule me, IFSDebt debt) OnIssuance is called after a debt is issued.

IFSDebtManagementRule.AllowTransfer
    public boolean AllowTransfer(IFSDebtManagementRule me, ISCObjectBase obj, double amount)

The system calls AllowTransfer when a transfer rule and the subsequent call to CheckExternalRules evaluate to a non-zero value. If the call returns false, the transfer is cancelled and processing resumes with the next available rule evaluation. If the call returns true, the system processes the transfer.

IFSDebtManagementRule.OnTransfer
    public void OnTransfer(IFSDebtManagementRule me, IFSAccountTransfer transfer)
    OnTransfer is called after a transfer executes.

IFSDebtManagementRule.OnCondition
    public void OnCondition(IFSDebtManagementRule me, IFSDebtException de)
    OnCondition is called after a debt exception is created.

Rule Modeling:

At the heart of the DMS Debt Management system is a set of rules encapsulated in FSDebtManagementRule objects that collectively define the policies governing debt management operations. Though there are three different types of rules—issuance, transference, and condition—all use the same FSDebtManagementRule class. The DMS user interface also manipulates all three types of rules in similar manners.

Creating New Debt Management Rules:

The rules-maintenance interface falls under the top-level Maint heading in the system. Through the Maint user interface you can create new debt management rules and examine or edit existing rules. See the DMS User Guide for details on using Maint.

RULE MODELING EXAMPLES

All rule formulas have access to properties and methods of any FSParty being evaluated, as well as to the properties and methods of the associated FSDebtManagementRule object. Automatic rules may also reference properties on SCCMLedgerItem, SCCMTransaction, and FSAccount.

The examples that follow use custom methods—such as the FirstOfYear( ) method in the first example—to convey the types of rule formulas possible.

Note: Rules with references to ledger items, transactions, or accounts are only evaluated against like objects (that is, a rule whose formula references LedgerItem will be ignored for incoming transactions and accounts).

Example 1

Issue an advance for one year's expected income for incoming ledger items whose product is Life.
  (LedgerItem.Product.Name=='Life' && LedgerItem.FirstOfYear( ))?11*LedgerItem.Credit: 0.0
  This formula uses the if-then-else operator, a ?b :c, which means if a is true, then return b; otherwise return c. Therefore, the sample formula says to issue an advance for eleven times the ledger item amount if the name of the ledger item's product is Life and the method LedgerItem.FirstOfYear( ) returns true. The formula specifies eleven times instead of twelve because the first month's compensation has already been issued.

Example 2

Issue an advance for six months. The advance equals the estimated compensation from the distributor's first transaction in each six month period for a given product.
  Transaction.FirstThisPeriod( )?6*Transaction.UnitPrice*0.3:0.0
  This formula assumes the existence of a custom method on ISCCMTransaction—
FirstThisPeriod( )—that returns true if the transaction is the first for its policy for the current six-month period.
  Here the compensation for the six month period is estimated at: 6*Transaction.UnitPrice*0.3. The example uses 6 because no compensation has yet been processed for this transaction. The value 0.3 is used as a rough estimate to calculate the monthly income from this policy. The value is an estimate since the system has not yet calculated the exact number.

Example 3

Transfer debt from parties with a lost status to a debt collection account.
  Account.Party.CheckStatus('LOST')? Account.Balance: 0.0
  This formula assumes the existence of a custom method on IFSParty that checks to see if the specified status is a current state for the party.
  Note: Transfer rules move funds (debt) from the examined account to the account specified in the ToAccount property of the rule.

Example 4

Raise a condition for accounts that have had a debt balance for over one year.
  Account.GetDebtLength( )>365 ?1:0
  This formula assumes the existence of a custom method on IFSAccount that returns the number of days a debt balance has existed.
  This formula will return 1 for accounts with debt balances that have lasted longer than a year. This return value will cause the debt management logic to create an FSDebtException and raise the condition (call the OnCondition( ) method).
Default Repayment Criteria/Formulas:
  The default repayment criteria maps to FSPaymentRule and the default formulas map to FSAdjustment objects. The criteria and formulas define the repayment schedule for a debt.

Example 5

Repay the debt with 100% of remaining compensation from any compensation source.
  Criteria: true
  Formula: RemainingAmount

Example 6

Repay the debt with 50% of gross compensation only from agreements AG1, AG2, AG3, AG4, AG5.
Solution 1
Criteria:
  LedgerItem.GetAgreement( ).Unid=='AG1'||
  LedgerItem.GetAgreement( ).Unid=='AG2'||
  LedgerItem.GetAgreement( ).Unid=='AG3'||
  LedgerItem.GetAgreement( ).Unid=='AG4'||
  LedgerItem.GetAgreement( ).Unid=='AG5'||
Formula:
BaseAmount*0.5
Solution 2
Criteria:
  Rule.CheckRightOfOffset(LedgerItem.GetAgreement( ))
Formula:
  BaseAmount*0.5
  This example demonstrates the modeling of a Right of Offset condition in which compensation from multiple agreements may be used to repay a debt. The second solution assumes the existence of a custom method on FSPaymentRule—
CheckRightOfOffset—that returns true if the specified agreement has right of offset with the current debt.
Party Match Formulas:
  Party match formulas are used to identify the parties whose debt situations are subject to evaluation by the owning debt management rule.
Example 1
  All parties should use this rule.
  True
  Returning true will make the formula evaluate to true for all parties in the system.
Example 2
  Only Bob should use this rule.
  Party.Name=='Bob'
Example 3
  Only parties whose primary address is in Texas should use this rule. Party.PrimaryContactUsage.ContactPoint. Address.State=='Texas'
Classes in the Debt Management Module:
  The following section lists and describes the classes included in the Debt Management Module.
FSDebtManagementRule
  The FSDebtManagementRule class defines the set of rules required to determine if a party is eligible for an advance, whether to allow a debt transfer, and whether to raise an attention condition.
RuleClass
  This enumerated property identifies the type of debt rule this FSDebtManagementRule represents. Currently valid values are ADVANCE, TRANSFER, and CONDITION. ADVANCE-typed rules issue debts (such as advances or draws). TRANSFER-type rules move debt among system accounts. And CONDITION-type rules generate FSDebtException objects.

Rules
  This SCFormula property encapsulates the set of rules that determine whether or not the associated action (advance issuance, debt transfer, condition generation) should occur.
RuleType
  A string describing the type of action this rule affects (such as Advance, Draw, Transfer, Collection, and WriteOff).
Reason
  A descriptive string specifying why this rule dispatches a particular action.
Automatic
  This boolean flag specifies whether or not the system should automatically execute the associated action (such as advance funds, transfer debt, raise condition).
ToAccount
  The FSAccount that is credited with the resultant advance (ADVANCE-type rules), is the source for a debt-transfer (TRANSFER-type rules), or generates a condition (CONDITION-type rules).
FromAccount
  The FSAccount which is charged for an advance (ADVANCE-type rules) or is the source for a debt-transfer (TRANSFER-type rules).
StartDate
  Rule effectivity date.
EndDate
  Rule expiration date.
DefaultRepaymentSchedule
  The default repayment criteria.
DefaultRepaymentAdjustment
  A non persistent property which points to the adjustment on the DefaultRepaymentSchedule.
PartyFormula
  An SCFormula which defines which parties in the system should use this rule.
Overrides
  This property contains a list of those FSDebtManagementRule objects this instance overrides. This property is used to override debt management rules at the agreement relationship level. None of the agreement-level rules listed in this property is evaluated (the default is to evaluate all applicable rules at all levels).
CheckExternalRules( )
  This method is called after the Rules property has been evaluated. It should be used to check external rules that have an impact on the action (such as regulatory rules, licenses and appointments). If implemented, this method must return the modified advance/transfer amount (for example, if the advance should be completely disallowed, this method must return 0.0).
OnAdvance( )
  This event trigger is called for ADVANCE-type rules when the evaluation of the Rules formula and the call to the CheckExternalRules( ) method have non-zero return values. The advance processing continues by generating an FSAdvance only if this event returns true. Deployments may override the default (null) implementation in order to provide custom advance processing.
OnTransfer( )
  This event trigger is called for TRANSFER-type rules when the evaluation of the Rules formula and the call to the CheckExternalRules( ) method have non-zero return values. The transfer processing continues by updating the associated account balances and generating a pair of FSAccountUpdateDetail objects only if this event returns true. Deployments may override the default (null) implementation in order to provide custom transfer processing.
OnCondition( )
  This event is called for CONDITION-type rules when the evaluation of the Rules formula and the call to the CheckExternalRules( ) method return non-zero values. The default implementation of this method creates an FSDebtException to record the raised condition.
FSDebt:
  The FSDebt class persists a single debt issuance as determined by an FSDebtManagementRule object.
Rule
  A reference to the FSDebtManagementRule that created this advance. In manually initiated advance, this property is null.
DebtType
  The type of advance (such as draw, advance, or loan).
Reason
  The reason for this advance.
ToAccount
  The system account that should be credited with this advance.
Component
  The component associated with this advance.
Holding
  The policy associated with this advance.
Product
  The product associated with this advance.
AgreementRelationship
  The agreement relationship associated with this advance. The party and agreement associated with the advance can be accessed via this property.
RepaymentSchedule
  This property contains the list of FSPaymentRule objects which define the repayment schedule for this debt. These rulesets will often contain variables representing the policy, product, and agreement associated with the advance.
FSDebtException
  This class maintains information related to the occurrence of a debt condition. Examples of debt conditions may be delinquent debt and written-off.
Date
  The date this condition occurred.
ExceptionType
  The type of condition (such as WRITEOFF or COLLECTION).
Reason
  The reason this condition was raised.
Rule
  The FSDebtManagementRule that raised this condition.
Data
  Arbitrary data associated with this condition.
SCFormula Properties in Payment and Debt Management Objects:
  In the Debt Management and Payment systems, SCFormula objects are used to model a variety of rules across several distinct classes. This section describes the application of the SCFormula to each of these rules in more detail. The Objects section for each rule lists the objects available to the SCFormula during its evaluation, that is, the properties on these objects can be used in the formula. The Variables section lists other variables that are available to the formula during evaluation.

FSPaymentRule.Rule:
These rules define a policy for executing a set of account adjustments. Note that these rules are also used to define debt repayment schedules; that is, the formula is set up to model a schedule that credits money to an account with a debt balance. The rule should return true to enable adjustment processing. Return values of false prevent processing of the associated adjustments.

Objects
LedgerItem
The current ledger item.
Debt
The current debt.
Rule
The current FSPaymentRule.
Variables
BaseAmount
The gross amount of the current FSDebt or SCCMLedgerItem being evaluated.
RemainingAmount
The net amount left from the current FSDebt or SCCMLedgerItem at this stage of processing.
Sample Procedure:
The following sample does the following:
1. Executes adjustments only if the current agreement is named Agr1 and the product is named Life. (Agreement.Name=='Agr1') && (Product.Name=='Life')
2. Executes adjustments only if the current policy ID is POL1A. Policy.PolicyID=='POL1A'
3. Define a 3-month long repayment schedule to credit a debt account $100 once a month. (Agreement.Name=='BigAgr' && (CurDate==#1/1/2000#||CurDate==#2/1/2000#||CurDate==#3/1/2000#) ?$100:0

FSAdjustment.Formula:
This formula calculates how much compensation is directed to/from a single FSAccount.
Objects and Variables
BaseAmount
The compensation amount as specified on the original SCCMLedgerItem or FSAdvance.
RemainingAmount
The net amount left from the current FSDebt or SCCMLedgerItem at this stage of processing.
LedgerItem
The current ledger item.
Debt
The current debt.
Rule
The current FSPaymentRule.
UpdateAccount
The target account as specified on the current FSAdjustment.
Examples
1. Direct 20% of this compensation to the linked account. 0.2*BaseAmount
2. Direct 20% but at most $100 of this compensation to the linked account. Min(0.s*BaseAmount, $100)

FSFinancialInfo.SplitFormula:
This formula calculates how much compensation is disbursed via the associated FSPaymentMethod.
Properties and Methods
Account
The currently examined FSAccount.
Agreement
The FSAgreement associated with the current FSAccount.
Component
The FSCompensationComponent associated with the current FSAccount.
Party
The FSParty associated with the current FSAccount.
Policy
The SCCMTransaction associated with the current FSAccount.
Product
The SCCMProduct associated with the current FSAccount.
BaseAmount
The total compensation amount that is being split over multiple FSFinancialInfo objects.
RemainingAmount
The amount of compensation remaining at this stage of processing (i.e., the base amount minus disbursements already executed).
Examples
Disburse 35% of the incoming compensation. 0.35*BaseAmount
If at least $500 is left, disburse 50%. Otherwise disburse 22% (RemainingAmount>=500) ?0.5*RemainingAmount: 0.22*RemainingAmount FSDebtManagementRule.Rule:
This formula is used in different ways according to the rule type of this FSDebtManagementRule. If the rule class is ADVANCE, this formula calculates the advance amount. If the rule class is TRANSFER, this formula calculates the transfer amount. If this rule class is CONDITION, the formula calculates whether or not to raise the condition.
Properties and Methods
Party
The current party.
Rule
The current rule.
Transaction
The current SCCMTransaction.
LedgerItem
The current SCCMLedgerItem.
Account
The current FSAccount.
Examples
Generate an advance for one year's worth of premiums for the current policy at 10% commission. 12*(0.1*Policy.UnitPrice)
If the currently examined FSAccount has a debt of less than $100, transfer the debt to the target account. (Account.Balance>−100 && Account.Balance<0)?Account.Balance: 0

What is claimed is:
1. A method for consolidating net payment and debt management using a computer system comprising:
performing using a computer system having a processor configured to execute instructions for:
obtaining one or more ledger items for a distributor from a commission model;
generating compensation for said distributor by processing said one or more ledger items through one or more adjustment rules, wherein each of said one or more adjustment rules operates on each of said one or more ledger items;
obtaining repayment rules for any advances received by said distributor;

dividing said compensation into one or more distribution amounts for payment into one or more accounts of said distributor based on one or more payment rules and said repayment rules, said one or more accounts comprising repayment accounts for said any advances and other payment accounts designated by said distributor; and paying said one or more distribution amounts into said one or more accounts of said distributor.

2. The method of claim 1 wherein each of said one or more ledger items represents commission payable to said distributor based on a sales agreement.

3. The method of claim 1 wherein each of said one or more ledger items represents commission payable to said distributor based on a sale item.

4. The method of claim 1 wherein each of said one or more accounts of said distributor uses a payment method.

5. The method of claim 1 wherein said payment method comprises a wire transfer.

6. The method of claim 1 wherein said distributor specifies said one or more payment rules.

7. The method of claim 1 wherein at least one of said one or more accounts of said distributor comprises an association with an alternate payee.

8. The method of claim 1 wherein said repayment rules for advances received by said distributor are generated by a method comprising:

determining a maximum amount of debt for said distributor;

issuing an advance not greater than said maximum amount to said distributor when a debt issuance rule associated with said distributor evaluates to true;

generating one or more repayment rules for said advance.

9. The method of claim 1 wherein said maximum amount is based on said one or more input ledger items.

10. A computer system comprising:

a processor; and a memory coupled to the processor, the memory having computer readable program code for consolidating net payment and debt management embodied therein, said computer readable program code configured to:

obtain one or more ledger items for a distributor from a commission model;

generate compensation for said distributor by processing said one or more ledger items through one or more adjustment rules, wherein each of said one or more adjustment rules operates on each of said one or more ledger items;

obtain repayment rules for any advances received by said distributor;

divide said compensation into one or more distribution amounts for payment into one or more accounts of said distributor based on one or more payment rules and said repayment rules, said one or more accounts comprising repayment accounts for said any advances and other payment accounts designated by said distributor; and pay said one or more distribution amounts into said one or more accounts of said distributor.

11. The computer system of claim 10 wherein each of said one or more ledger items represents commission payable to said distributor based on a sales agreement.

12. The computer system of claim 10 wherein each of said one or more ledger items represents commission payable to said distributor based on a sale item.

13. The computer system of claim 10 wherein each of said one or more accounts of said distributor uses a payment method.

14. The computer system of claim 1 wherein said payment method is by wire transfer.

15. The computer system of claim 10 wherein said one or more payment rules are specified by said distributor.

16. The computer system of claim 10 wherein at least one of said one or more accounts of said distributor is an alternate payee.

17. The computer system of claim 10 wherein said repayment rules for any advances received by said distributor are generated by computer readable program code configured to:

determine the maximum amount of debt for said distributor;

issue an advance not greater than said maximum amount to said distributor when a debt issuance rule of said distributor evaluates to true;

generate one or more repayment rules for said advance.

18. The computer system of claim 1 wherein said maximum amount is based on said one or more input ledger items.

19. An apparatus for consolidating net payment and debt management using a computer system, the apparatus comprising:

means for obtaining one or more ledger items for a distributor from a commission model;

means for generating compensation for said distributor by processing said one or more ledger items through one or more adjustment rules, wherein each of said one or more adjustment rules operates on each of said one or more ledger items;

means for obtaining repayment rules for any advances received by said distributor;

means for dividing said compensation into one or more distribution amounts for payment into one or more accounts of said distributor based on one or more payment rules and said repayment rules, said one or more accounts comprising repayment accounts for said any advances and other payment accounts designated by said distributor; and means for paying said one or more distribution amounts into said one or more accounts of said distributor.

20. The method of claim 1 wherein the repayment rules for any advances received by the distributor include repayment rules for advances from a payor of the one or more distribution amounts to the distributor.

21. The method of claim 1 wherein the repayment rules define at least two items from a group consisting of:

classes of distributors who qualify for advances;

qualification criteria for advances, wherein the qualification criteria includes one or more members of a group consisting of a length of service of the distributor, sales history of the distributor, and past earnings of the distributor;

a ratio of advances to projected income of the distributor;

a repayment schedule and an interest rate to be paid on the advances;

a source of repayment income; and an accelerated repayment schedule.

22. The method of claim 1 wherein the repayment rules are customizable to the distributor.

23. The computer system of claim 10 wherein the repayment rules for any advances received by the distributor include repayment rules for advances from a payor of the one or more distribution amounts to the distributor.

24. The computer system of claim 10 wherein the repayment rules define at least two items from a group consisting of:
- classes of distributors who qualify for advances;
- qualification criteria for advances, wherein the qualification criteria includes one or more members of a group consisting of a length of service of the distributor, sales history of the distributor, and past earnings of the distributor;
- a ratio of advances to projected income of the distributor;
- a repayment schedule and an interest rate to be paid on the advances;
- a source of repayment income; and
- an accelerated repayment schedule.

25. The computer system of claim 10 wherein the repayment rules are customizable to the distributor.

26. The apparatus of claim 19 wherein the repayment rules for any advances received by the distributor include repayment rules for advances from a payor of the one or more distribution amounts to the distributor.

27. The apparatus of claim 19 wherein the repayment rules define at least two items from a group consisting of:
- classes of distributors who qualify for advances;
- qualification criteria for advances, wherein the qualification criteria includes one or more members of a group consisting of a length of service of the distributor, sales history of the distributor, and past earnings of the distributor;
- a ratio of advances to projected income of the distributor;
- a repayment schedule and an interest rate to be paid on the advances;
- a source of repayment income; and
- an accelerated repayment schedule.

28. The apparatus of claim 19 wherein the repayment rules are customizable to the distributor.

* * * * *